United States Patent
Adam et al.

(10) Patent No.: US 9,719,446 B2
(45) Date of Patent: Aug. 1, 2017

(54) REDUCTION OF $N_2O$ IN THE EXHAUST GAS OF LEAN-BURN PETROL ENGINES

(71) Applicant: UMICORE AG AND CO. KG, Hanau-Wolfgang (DE)

(72) Inventors: Frank Adam, Linsengericht (DE); Stephan Eckhoff, Alzenau (DE); Sebastian Mueller, Maintal (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 14/917,860

(22) PCT Filed: Aug. 20, 2014

(86) PCT No.: PCT/EP2014/067705
§ 371 (c)(1),
(2) Date: Mar. 9, 2016

(87) PCT Pub. No.: WO2015/036208
PCT Pub. Date: Mar. 19, 2015

(65) Prior Publication Data
US 2016/0222901 A1    Aug. 4, 2016

(30) Foreign Application Priority Data

Sep. 11, 2013    (DE) .................. 10 2013 218 234

(51) Int. Cl.
*F01N 3/00*    (2006.01)
*F02D 41/14*    (2006.01)
(Continued)

(52) U.S. Cl.
CPC ....... *F02D 41/1446* (2013.01); *F01N 3/0807* (2013.01); *F01N 3/0814* (2013.01);
(Continued)

(58) Field of Classification Search
CPC .... F01N 3/0807; F01N 3/0842; F01N 3/0871; F01N 3/101; F02D 41/0275; F02D 41/1446
(Continued)

(56) References Cited

U.S. PATENT DOCUMENTS

| | | | |
|---|---|---|---|
| 5,771,686 A | 6/1998 | Pischinger et al. | |
| 6,553,757 B1 | 4/2003 | Surnilla et al. | |

(Continued)

FOREIGN PATENT DOCUMENTS

| DE | 19543219 C1 | 12/1996 |
|---|---|---|
| DE | 19641644 A1 | 4/1998 |

(Continued)

OTHER PUBLICATIONS

International Search Report for PCT/EP2014/067705, dated Mar. 19, 2015. German with English Translation. 4 pages.

(Continued)

*Primary Examiner* — Jason Shanske
(74) *Attorney, Agent, or Firm* — Smith, Gambrell & Russell, LLP

(57) ABSTRACT

The present invention relates to the use of different regeneration strategies for nitrogen oxide storage catalysts (NOx storage catalyst, LNT or NSC), depending on the exhaust gas temperatures, to reduce in the total exhaust gas the greenhouse gas $N_2O$ (nitrous oxide) that is produced as a secondary emission during the regeneration of the storage catalyst. If the exhaust gas temperature is below 275° C.-290° C., regeneration takes place using a strategy with short pulses of around 2 seconds and λ Lambda 0.95 rich.

16 Claims, 2 Drawing Sheets

(51) Int. Cl.
*F01N 3/08* (2006.01)
*F01N 3/10* (2006.01)
*F02D 41/02* (2006.01)

(52) U.S. Cl.
CPC ......... *F01N 3/0842* (2013.01); *F01N 3/0871* (2013.01); *F01N 3/101* (2013.01); *F02D 41/0275* (2013.01); *F01N 2260/04* (2013.01); *F01N 2570/14* (2013.01); *F01N 2570/145* (2013.01); *Y02C 20/10* (2013.01); *Y02T 10/22* (2013.01)

(58) Field of Classification Search
USPC .......................................................... 60/295
See application file for complete search history.

(56) References Cited

U.S. PATENT DOCUMENTS

| | | | |
|---|---|---|---|
| 6,602,820 B1 | 8/2003 | Goebel et al. | |
| 8,512,658 B2 | 8/2013 | Eckhoff et al. | |
| 8,820,054 B2 | 9/2014 | Bisaiji et al. | |
| 9,021,788 B2 | 5/2015 | Inoue et al. | |
| 9,328,682 B2 | 5/2016 | Hoyer et al. | |
| 2006/0196175 A1* | 9/2006 | Endicott | F01N 3/0842 60/295 |
| 2006/0213187 A1* | 9/2006 | Kupe | B01D 53/9431 60/286 |
| 2010/0050604 A1* | 3/2010 | Hoard | F01N 3/0807 60/286 |
| 2010/0233051 A1 | 9/2010 | Grisstede et al. | |
| 2012/0042631 A1* | 2/2012 | Schmieg | B01D 53/9463 60/274 |
| 2012/0148464 A1 | 6/2012 | Eckhoff et al. | |
| 2012/0214663 A1* | 8/2012 | Chigapov | B01J 37/0203 502/73 |
| 2014/0090362 A1 | 4/2014 | Eckhoff et al. | |

FOREIGN PATENT DOCUMENTS

| | | | | |
|---|---|---|---|---|
| DE | 102009039249 A | 8/2009 | | |
| DE | 10249026 B4 | 4/2010 | | |
| DE | 102008048854 A1 | 4/2010 | | |
| DE | 102010014468 A1 | 10/2011 | | |
| DE | WO 2011124357 A1 * | 10/2011 | ........... | F01N 3/0814 |
| DE | 102011101079 A1 | 11/2012 | | |
| DE | 102013207709 A1 | 10/2014 | | |
| EP | 1101528 A2 | 5/2001 | | |
| EP | 1317953 A1 | 6/2003 | | |
| EP | 1386656 A1 | 2/2004 | | |
| EP | 1398069 A2 | 3/2004 | | |
| EP | 1016448 B1 | 5/2006 | | |
| EP | 1321186 B1 | 7/2006 | | |
| EP | 1536111 B1 | 8/2006 | | |
| EP | 1837497 A1 | 9/2007 | | |
| EP | 1911506 A1 | 4/2008 | | |
| GB | 2424197 B | 1/2009 | | |
| WO | 2005092481 A1 | 10/2005 | | |
| WO | 2011023332 A1 | 3/2011 | | |
| WO | 2011124357 A1 | 10/2011 | | |
| WO | 2012140784 A1 | 10/2012 | | |
| WO | 2013008342 A1 | 1/2013 | | |

OTHER PUBLICATIONS

Ball, Douglas, et al. $N_2O$ Emissions of Low Emission Vehicles. SAE International. 2013-01-1300, vol. 6, Issue 2 (Jun. 2013). 7 pages.

Hausberger, Stefan. $N_2O$ aus mobile Quellen. ACCC-Workshop, pp. 1-13. (http://www.accc.gv.at/pdf/no-hausberger.pdf).

Gifhorn, V.A., et al. Einfluss abgasspezifischer Parameter auf die $N_2O$-Bilding am Pd/Rh-Katalysator [Influence of Exhaust Gas-Specific Parameters on $N_2O$ Formation on a Pd/Rh Catalyst]. MTZ Motortechnische Zeitschrift 59 (1998) 6, pp. 378-383.

Pihl, Josh A., et al. Lean $NO_x$ Trap Chemisty Under Lean-Gasoline Exhaust Conditions: Impact of High $NO_x$ Concentrations and High Temperature. Topics in Catalysis, vol. 56, Issue 1-8, May 2013, pp. 89-93.

Adam, Frank, et al. Katalysatortechnologien für stöchiometrisch und mager betriebene Otto-Motoren mit dem Ziel der $CO_2$ Reduktion, Kapitel 3 [Catalyst Technologies for Stoichiometric and Lean-Burn Petrol Engines With the Goal of Reducing $CO_2$ Emission Control, Chapter 3]. Dresden 2010, pp. 335-357.

Miyoshi, Naoto, et al. Development of New Concept Three-Way Catalyst for Automotive Lean-Burn Engines. SAE Technical Paper Series 950809, Feb. 27-Mar. 2, 1995, pp. 121-130.

Written Opinion of the International Search Authority for PCT/EP2014/067705, dated Mar. 19, 2015. German with English Translation. 12 pages.

International Preliminary Report on Patentability Chapter for PCT/EP2014/067705, dated Mar. 15, 2016. German with English Translation. 16 pages.

* cited by examiner

REDUCTION OF $N_2O$ IN THE EXHAUST GAS OF LEAN-BURN PETROL ENGINES

The present invention relates to a method for the treatment of exhaust gas of lean-burn combustion engines. In particular, the present invention relates to the reduction of the proportion of secondary emissions, in particular of the greenhouse gas $N_2O$ in the total exhaust gas of an exhaust gas aftertreatment system with at least one NOx storage catalyst as exhaust gas cleaning element.

It is frequently the case with lean-burn combustion engines (diesel, SGDI) that nitrogen oxide storage catalysts are used for exhaust gas aftertreatment (NOx storage catalysts, LNT, NSC). In lean exhaust gas ($\lambda>1$), said catalysts are capable of temporarily storing nitrogen oxides and of being regenerated in stoichiometric or rich exhaust gas ($\lambda \leq 1$) through reduction of the stored nitrogen oxides to nitrogen (DE102011101079A1). Depending on the operating mode, nitrous oxide ($N_2O$), also known as laughing gas, can be released as a secondary emission during the regeneration of the NOx storage catalysts. However, once formed it is difficult to reduce the laughing gas under the given exhaust gas conditions. To date, the emission of $N_2O$ from motor vehicles has not been regulated. However, as laughing gas is a powerful greenhouse gas, a threshold value of 0.006 g/km (0.01 g/mile) for $N_2O$ emissions is already being discussed, for example, in the US. This value is difficult to achieve with previous exhaust gas aftertreatment concepts using NOx storage catalysts (SAE, 2013 Umicore, 2013-01-1300 $N_2O$ Emissions of Low Emission Vehicles).

DE19641644A1 describes a method for the decomposition of $N_2O$ in air separation plants during the production of noble gases, wherein methane and $N_2O$ in an atmosphere of 98% oxygen are simultaneously catalytically reacted in a deoxygenation stage. Catalysts containing Pt, Pd, Au or Ag are recommended as catalysts, which are operated in a temperature range of 400-600° C. This method for the reduction of $N_2O$ is not suitable for the cleaning of exhaust gas from engines as, in that case, the temperatures in the catalysts are between 200 and 450° C. The $N_2O$ conversion at these temperatures in lean atmospheres is only very small.

EP1536111B1 describes a method for the reduction of secondary emissions, such as methane and $N_2O$, in the exhaust gas of combustion engines which are fitted with NOx storage catalysts. In order to be able to prevent secondary emissions which, during the rich operation to regenerate the NOx storage catalyst, are formed via the latter, it is proposed that an additional catalyst be arranged downstream of the NOx storage catalyst. This catalyst is able to oxidize methane and $N_2O$ and comprises two different catalytically active materials. A palladium-containing catalyst is proposed for the oxidation of methane and an iron-zeolite catalyst is recommended for the reduction of $N_2O$. It is known that methane or $N_2O$ can be effectively reacted in lean atmospheres via palladium-containing or iron-zeolite catalysts. However, the reaction of $N_2O$ in lean atmospheres over Pd catalysts is very small and the reaction over iron-zeolite catalysts only occurs at higher temperatures in excess of approx. 400° C. To ensure that the operation of the catalyst for $N_2O$ reduction is decidedly lean, which is certainly advisable for reacting methane, EP1536111B1 additionally recommends a secondary air injection upstream of the catalyst positioned downstream. As described at the beginning, this does not, however, result in the desired $N_2O$ reduction at low temperatures.

DE102010014468A1 relates to a method for the aftertreatment of exhaust gas of essentially lean-burn combustion engines, as well as an appropriately advantageous exhaust gas aftertreatment system. In particular, this invention relates to the reduction of the proportion of the greenhouse gas $N_2O$ in the total exhaust gas of an appropriate combustion system with an NOx storage catalyst as the exhaust gas cleaning element. The objective of the invention is to operate the $N_2O$ reduction catalyst arranged downstream of the NOx storage catalyst under $\lambda \leq 1$ conditions as soon as the $N_2O$ formed by the NOx storage catalyst reaches the $N_2O$ reduction catalyst.

It is known that the formation of $N_2O$ on a three-way catalytic converter is particularly intensive with stoichiometrically operated combustion engines in a specific temperature range and with specific $\lambda$-values (Hausberger, ACCC-Workshop "$N_2O$ and das Kyoto-Ziel" [N2O and the Kyoto-Target"], http://www.accc.gv.at/pdf/no-hausberger.pdf; Gifhorn et al., Einfluss abgasspezifischer Parameter auf die $N_2O$-Bildung am Pd/Rh-Katalysator [Influence of Exhaust Gas-Specific Parameters on $N_2O$ Formation on a Pd/Rh Catalyst], MTZ Motortechnische Zeitschrift 59 (1998) 6). Pihl et al. describe the development of, inter alia, $N_2O$ during the regeneration of NOx storage catalysts. It is pointed out, in particular, that the development of $N_2O$ is more likely forced by low temperatures and by frequent rich-lean conversion. The use of a larger NOx storage catalyst is provided as a solution (Lean NOx Trap Chemistry Under Lean-Gasoline Exhaust Conditions: Impact of High NOx Concentrations and High Temperature; Pihl, Josh A.; Lewis, Jennifer A.; Toops, Todd J.; Parks, James E., *Topics in Catalysis*, vol. 56, issue 1-8 May 2013, p. 89-93).

A method is known from DE10249026B4 with which specific fixed air-fuel ratios for regeneration in the exhaust gas are set in relation to the temperature of the storage catalyst. GB2424197B teaches that better regeneration of a nitrogen oxide storage catalyst can be accompanied by different profiles of the fuel pulse which are selected based upon the dead storage material. The $N_2O$ problem is not addressed in either of the publications.

On balance it is important to highlight that only unsatisfactory methods are known in the prior art for the reduction of the greenhouse gas $N_2O$, which occurs during the regeneration of nitrogen oxide storage catalysts in the exhaust gas of lean-burn combustion engines, in particular petrol engines.

The object of the present invention was, therefore to state an option for maximally suppressing the formation of $N_2O$ during the regeneration of nitrogen oxide storage catalysts. This and other objects evident from prior art to the person skilled in the art are solved by a method having the characteristics of the present invention. Preferred embodiments of the invention are addressed herein.

The fact that different strategies are used during the regeneration of one or more possibly consecutively arranged nitrogen oxide storage catalysts to reduce the formation of $N_2O$ during regeneration by specifically selecting the different regeneration strategies based on the temperature of the exhaust gas, such that below a temperature range of 275° C.-290° C. regeneration occurs with shorter, but richer pulses of reducing agents than it does at temperatures above this temperature range, means that the specified object is achieved extremely surprisingly, but no less advantageously. The measure discussed here allows the $N_2O$ emissions in the exhaust gas to be reduced to such an extent that, for example, the threshold values planned for $N_2O$ emissions in the US can be complied with.

As just indicated, the regeneration strategies, which are used here for the regeneration of one or more nitrogen oxide storage catalysts, possibly arranged one behind the other, preferably directly one behind the other, should be specifically selected based on the temperature. Regeneration using reducing agent pulses occurs such that the respectively shorter, but richer pulse is selected from a group of two different reducing agent pulses as soon as the ECU recognizes that the catalyst to be regenerated is below the given temperature range. At temperatures above this range, less rich pulses than those which are advantageously used below this temperature range are definitely preferred.

It can be seen directly in FIG. 1 that shorter and more intensive symmetrical pulses of reducing agents can drastically reduce the formation of $N_2O$ below the temperature range (from approx. 80% to less than 40% based on the highest emission in the test). A more differentiated picture is produced above this temperature range. With this regeneration strategy, the result (FIG. 1) is that, depending on the temperature present (e.g. 300 and 320° C.), either long, less rich pulses (e.g. more than 5 seconds, preferably more than 7 seconds and $\lambda > 0.99 - <1$) produce better results or, compared herewith, above the temperature range of 330-345° C. shorter moderately richer pulses (e.g. more than 5 seconds, preferably less than 7 seconds and $\lambda > 0.96 - <0.99$) are preferred.

FIG. 2 shows a similar picture for a rich/$\lambda=1$ strategy (see below for explanation). At a temperature below approx. 300° C., the development of $N_2O$ during the regeneration strategy applied here is particularly advantageous when short and intensively rich pulses (e.g. under 3 seconds and a $\lambda$ of $>0.90 - <0.96$) are used, whereas a more differentiated picture emerges above the temperature range. In this case the respectively less rich pulses are preferred with a tendency to shorter regeneration times (e.g. under 3 seconds and a $\lambda$ of $>0.96 - <0.99$). The exemplary calibrated system (FIG. 3) makes this particularly clear when the strategies are compared at 250° C. and 300° C. in FIG. 2. While at 250° C. the strategy "Reg. 4s: 2s rich 0.95 and 2s lambda=1" is preferred, at 300° C. the strategy "Reg. 4 s: 2 s rich 0.98 and 2 s lambda=1" (FIG. 2) is preferred. Above the given temperature range the $N_2O$ formation then develops almost uniformly with respect to the rich/$\lambda=1$ strategy used until, at a temperature of 400° C., almost no more difference is to be observed between the individual regeneration strategies (FIG. 2).

The person skilled in the art must decide for himself, based on the actual exhaust system and environmental conditions such as temperature, the catalyst's degree of aging, type of reducing agent, exhaust gas speed and exhaust gas composition, which regeneration strategy is ultimately the best for use above the upper temperature limit. As a general rule, however, a change in the $N_2O$ formation mechanism obviously occurs in the given temperature range of 275-290° C., which can be captured by selecting the regeneration strategies in accordance with the invention. Depending on the nitrogen oxide storage catalyst used, the degree of aging of the catalyst, exhaust gas speed, system or exhaust gas composition, this change in the temperature window can vary from 275° C. to 290° C. The threshold temperature is preferably within a temperature range of 280-290° C. and particularly preferably is 285° C. In general, the present invention is used preferably in the rich exhaust gas range of up to $\lambda \geq 0.87$, more preferably $\lambda \geq 0.9$, and particularly preferably $\lambda \geq 0.93$. The term "rich" according to the invention is taken to mean an exhaust gas composition which has a $\lambda < 1$.

In a first approach, a nitrogen oxide storage catalyst is regenerated, as addressed above, by reducing the $\lambda$-value of the exhaust gas and passing the resulting exhaust gas mixture over the nitrogen oxide storage catalyst. The temperature of the storage catalyst should then preferably be within a temperature window between 200° C. and 450° C. so that, on the one hand, rapid reduction is assured and, on the other hand, no desorption occurs without the re-released nitrogen oxides being converted, which can be triggered by too high temperatures. The task of efficiently and effectively freeing the nitrogen oxide storage catalyst(s) of stored nitrogen oxides using as small a quantity of additional fuel as possible is always paramount.

Selecting the regeneration strategy based on the temperature means that different regeneration strategies should be applied, depending on the temperature of the exhaust gas. To this end, it can be quite reasonable, under consideration of the boundary conditions according to the invention, to divide up the regeneration temperature range into several temperature windows in which different regeneration strategies can then be used advantageously. In so doing, the regeneration temperature window of 200-450° C. can be divided preferably into two or more ranges, particularly preferably into 4 ranges in each of which different strategies are used (Table 1). Depending on the specification and the environmental conditions, according to the above statement, the person skilled in the art can also define 5 or more temperature windows in which different regeneration strategies are used. The following strategy breakdown and selection may serve as an example:

I. Temperature window ~230-275° C. Strategy 9
II. Temperature window ~290-330° C. Strategy 3, 6, 8, 9 (preferably 3)
III. Temperature window ~345-400° C. Strategy 3, 6, 8 (preferably 3)
IV. Temperature window >400° C. Strategy 2-8

Where there are several equally good strategies, the strategy which is most compatible with the above mentioned efficiency criteria is preferably selected. Also, as few additional harmful emissions as possible should occur. In this case, the person skilled in the art will be able to make an optimum selection.

The following processes were predefined as regeneration strategies for the system (FIG. 3) considered here (Table 1):

TABLE 1

| Reg. Strat.: | |
|---|---|
| 1 | Reg. 4 s: 4 s rich 0.95 |
| 2 | Reg. 4 s: 2 s rich 0.95 and 2 s lambda = 1 |
| 3 | Reg. 4 s: 2 s rich 0.98 and 2 s lambda = 1 |
| 4 | Reg. 6 s: 6 s rich 0.98 |
| 5 | Reg. 6 s: 3 s rich 0.95 and 3 s lambda = 1 |
| 6 | Reg. 6 s: 3 s rich 0.98 and 3 s lambda = 1 |
| 7 | Reg. 8 s: 4 s rich 0.95 and 4 s lambda = 1 |
| 8 | Reg. 8 s: 4 s rich 0.98 and 4 s lambda = 1 |
| 9 | Reg. 10 s: 10 s rich 0.995 |

As already indicated, the respective regenerations can be designed with symmetrical, uniform fuel pulses (strategy 1, 4 and 9), or such that a modulation of the $\lambda$-amplitude of the regeneration pulse is provided in such a way that a rich pulse is directly followed by a phase with an exhaust gas mixture at $\lambda=1$ (rich/$\lambda=1$ strategy). The use of such a regeneration strategy has proven to be advantageous over the above-mentioned temperature range of 275° C. to 290° C. In particular, regeneration strategy 3 with respect to the exhaust system tested here can be applied advantageously above this temperature range. The regeneration periods to be applied (individual phases with $\lambda \leq 1$ with the aim of denitrification of the nitrogen oxide storage catalysts) are generally in the seconds range, preferably under 10 sec., more preferably under 8, and particularly preferably under 6 sec.

The present invention is preferably used for so-called spray-guided and stratified operating lean-burn petrol engines (so-called "lean GDI" engines). A lean-burn petrol engine can work in a so-called homogeneous operation or in stratified charge mode (stratified operating gasoline engine). The person skilled in the art understands the term stratified charge mode to mean an operating mode of the engine in which the mixture is concentrated around the spark plug, positioned centrally in the combustion chamber, wherein pure air is found in the peripheral regions of the combustion chamber. The associated reduction in consumption results on the one hand from the dethrottling of the engine, and on the other hand to a not inconsiderable extent from the minimized heat losses which are facilitated by the combustion running centrally in the combustion chamber with a surrounding insulating atmosphere. In this mode, the fuel is injected in the final third of the upward motion of the piston. The combination of targeted air flow and the special geometry of the piston, which has a pronounced fuel and flow trough, enables the particularly finely atomized fuel to be concentrated optimally around the spark plug in a so-called "mixture ball" and safely inflamed. The engine control system ensures the optimal adjustment of the injection parameters (injection timing, fuel pressure) each time (Der neue V6 Ottomotor mit Direkteinspritzung von Mercedes Benz [The New V6 Petrol Motor with Direct Injection from Mercedes Benz]; Vienna 2010; A. Waltner et al.; V6 and V8-Ottomotoren [V6 and V8 Petrol Engines]; MTZ extra April 2012; G. Doll et al.; Handbuch Verbrennungsmotor [Combustion Engine Handbook]; 2nd Edition 2002 Vieweg Verlag; A. Koch, K. Wenzlawski; H. Tschöke, G. P. Merker). In contrast to the wall-guided injection of fuel, the spray-guided injection of fuel into the cylinder involves the fuel being injected directly in the proximity of the spark plug during suction where it vaporises. Exact positioning of the spark plug and injection nozzle, and precise spray alignment, are required to be able to ignite the mixture at the right point in time. This system should help to improve performance and reduce fuel consumption (Guido Vent, Aachen 2012, The new 2.0 I turbo engine; Lückert, Wiener Motorensymposium [Vienna Motor Symposium] 2011, Potenziale strahlgeführter Brennverfahren in Verbindung mit Downsizing Konzepten [Potential Spray-Guided Combustion Processes Combined with Downsizing Concepts).

The application of different regeneration strategies described here is, as mentioned, used in the exhaust gas of lean-burn engines, preferably petrol, or gasoline engines. In the partial-load range of petrol engines, the specific fuel consumption is reduced by operation with excess air ($\lambda$>1 or hos (homogeneous stratification operation)), the so-called lean burn. In lean burn, the total charge mass, and consequently the effective compression, is increased as a result of the excess air which causes increasing temperatures and pressures after compression. A larger charge mass is added to the heat quantity released during combustion, whereby, however, the average process temperature falls; all in all, this results in a colder exhaust gas. This is significant with respect to the regeneration of the nitrogen oxide storage catalysts and, in particular, the formation of $N_2O$ during regeneration.

As a result of this type of combustion, nitrogen oxides also occur in the engine of lean-burn petrol engines. Several techniques are known for increasing the concentration of the reducing components required to reduce the nitrogen oxides (known as reducing agent pulses according to the invention) in the exhaust gas. To this end, reference is made to the pertinent literature already known (Handbuch Verbrennungsmotor [Combustion Engine Handbook], Vieweg Verlag, 2002, 2nd Edition Basshuysen/Schäfer). The addition of the fuel to the exhaust gas can be achieved by injecting it directly into the exhaust gas system upstream of the nitrogen oxide storage catalyst, or by injecting fuel into the cylinder of the engine. In the former case, special means are necessary which allow the fuel to be injected into the exhaust gas flow (WO11124357A1). The regeneration of a nitrogen oxide storage catalyst is, however, usually initiated by the exhaust gas of the lean-burn engine being increased in the stoichiometric range ($\lambda$=1), or even better in the rich range ($\lambda$<1), by the addition of fuel into the cylinder, and then being passed over the nitrogen oxide storage catalyst. The regeneration of the nitrogen oxide storage catalyst is usually controlled by sensors or based on modeling (Der neue 2,0-I-TDI-Motor von Volkswagen für niedrigste Abgasgrenzwerte [The New 2.0 I TDI Engine from Volkswagen for Lowest Threshold Values], MTZ May 8; J. Hadler et al.).

It should be noted that a regeneration at $\lambda$<0.9 increasingly leads to the formation of $NH_3$ as an additional secondary emission. For this reason, this range is excluded as far as possible herein as an applicable regeneration strategy. However, should $NH_3$ be formed deliberately, e.g. because it is to be stored in an SCR catalyst arranged downstream, then such ranges are to be included in the present calculus.

The present invention is to be applied in principle to the use of any nitrogen oxide storage catalyst in the exhaust gas of lean-burn engines, in particular of the spray-guided and stratified operating lean-burn petrol engines mentioned above. In particular, it can be operated well with a system which provides for one or more three-way catalytic converters arranged in proximity to the engine and one or more nitrogen oxide storage catalysts arranged in proximity to the engine as an exhaust gas cleaning system. Quite especially preferably, the system contains a three-way catalytic converter in proximity to the engine in conjunction with two nitrogen oxide storage catalysts in proximity to the engine (FIG. 3). In proximity to the engine is understood to mean an area in the exhaust gas system which is at a maximum distance of 1 m, preferably at a maximum distance of 80 cm, or more preferably at a maximum distance of 50 cm from the exhaust gas outlet of the engine block.

In principle, all the catalytic converters which are eligible for this purpose and known to the person skilled in the art can be used as three-way catalytic converters (F. Adam et al.; Emission Control, Dresden 2010, Katalysatortechnologien für stöchiometrisch and mager betriebene Otto-Motoren mit dem Ziel der $CO_2$ Reduktion, Kapitel 3 [Catalyst Technologies for Stoichiometric and Lean-Burn Petrol Engines With the Goal of Reducing $CO_2$, Chapter 3]. Verbesserung der Katalysatorformulierungen für die magere Abgasnachbehandlung [Improvement of Catalyst Formulations for Lean-Burn Exhaust Gas Treatment]).

The operating principle of nitrogen oxide storage catalysts is described in detail in SAE document SAE950809. The storage phase for nitrogen oxides (lean operation) usually lasts 100 to 2000 seconds and is dependent upon the storage capacity of the catalyst and the concentration of the nitrogen oxides in the exhaust gas. In the case of aged catalysts with reduced storage capacity, the duration of the storage phase can, however, also fall to 50 seconds or fewer. The regeneration phase (rich operation) is, in contrast, always significantly shorter and only lasts a few seconds (2 s-20 s). The exhaust gas escaping from the nitrogen oxide storage catalyst during regeneration fundamentally does not exhibit any more harmful substances and is composed approximately stoichiometrically. Its air ratio λ (Lambda: indicates the ratio of fuel to air in the exhaust gas—see below) is almost equal to 1 during this period.

Nitrogen oxide storage catalysts are sufficiently known to the person skilled in the art. Reference is made to the pertinent literature in relation to their design (DE102009039249A, DE102008048854A, WO13008342A1, WO12140784A1, WO2011023332A, WO2005092481A, EP1317953A1, EP1016448B1, EP1321186B1, EP1911506A and EP1101528A). The nitrogen oxide storage materials are usually basic compounds of alkali or alkaline earth metals which are deposited on suitable carrier materials in finely divided form. Furthermore, a nitrogen oxide storage catalyst also has catalytically active precious metals of the platinum group and oxygen storage materials. This composition lends a nitrogen oxide storage catalyst under stoichiometric operating conditions the functionality of a three-way catalytic converter (DE102009039249A and the literature cited there).

The basic compounds of alkali metals, alkaline earth metals, in particular, however, barium oxide, and the rare earth metals, in particular, cerium oxide, are predominantly used as storage components in nitrogen oxide storage catalysts, the basic compounds reacting with nitrogen dioxide to give the appropriate nitrates. As a cerium-containing storage material, such a one selected from the group consisting of cerium oxide, a cerium-zirconium mixed oxide, a cerium oxide doped with rare earth and combinations thereof is preferably eligible. The cerium-zirconium mixed oxide is preferably doped with 0.5 to 10 wt % lanthanum and/or praseodymium oxide, in relation to the total weight of the cerium-zirconium mixed oxide and lanthanum and/or praseodymium oxide. Preferred basic storage materials are compounds containing Mg, Ba, Sr and Ca. It is known that these materials are present in the air, for the most part in the form of carbonates and hydroxides. These compounds are also suitable for storing nitrogen oxides. For this reason, when basic storage materials containing alkaline earth metal are mentioned in the context of the invention, they also include relevant carbonates and hydroxides. Usually, the precious metals of the platinum group (e.g. Pt, Pd, Rh) are used as catalytically active components which, like the storage components, are deposited on a carrier material. Suitable carrier materials for the components are temperature-stable metal oxides with large surface areas of more than 10 m$^2$/g, which facilitate a highly dispersed deposition of the storage components. For example, cerium oxide, cerium-containing mixed oxides, aluminum oxide, magnesium oxide, magnesium-aluminum mixed oxides, rare earth and some ternary oxides are suitable. For the most part, active aluminum oxide with a large surface area is used as the carrier material. The nitrogen oxide storage catalyst, which by application of the described method can be advantageously used, is, in its preferred embodiment, applied as a wall coating to an inert carrier body made of ceramic or metal. Flow honeycombs made of ceramic or metal are well suited as carrier bodies for automobile applications. The nitrogen oxide storage catalyst envisaged here can also be present as a carrier body on or in a particle filter (EP1837497A1, EP1398069A2, DE102009039249A). The term "on or in" means that it is possible to apply a coating to the wall or in the porous cavities of said wall.

In addition to the above-mentioned storage materials, the present nitrogen oxide storage catalysts also contain precious metals, as stated. The person skilled in the art orients himself, in relation to the quantity and type, toward the prior art for catalysts noted at the beginning. Preferably, such metals selected from the group consisting of palladium, platinum and rhodium are used as precious metals. The proportions can be selected in accordance with the knowledge available to the person skilled in the art, advantageously the platinum content in the storage material is 30-150, preferably 40-100 and quite preferably 50-70 g/cft. In relation to palladium, values of 10-150, preferably 20-100 and quite preferably 30-80 g/cft result. The rhodium is also present in a quantity of 0.5-10, preferably 1-8, and quite preferably 1-5 g/cft in the catalyst material. The ratio of metals to one another is 50-100:10-50:1-5 (Pt:Pd:Rh), preferably 70-90:12-30:2-4 and particularly preferably 80:16:3 (respectively ±10%).

In accordance with the invention, the proposed nitrogen oxide storage catalyst has a specific ratio of cerium-containing storage materials to alkali earth metal storage materials. The ratio of 10:1 to 20:1 relates to the weight of the oxides of these two components ($CeO_2$:alkali earth metal oxide). Preferably, the ratio is 12:1 to 19:1 and quite particularly preferably between 12.5:1 and 18:1. A similarly necessary desulfurization of a nitrogen oxide storage catalyst constructed in this way already occurs at temperatures of ≥500°; preferably 550°-700° C.; and quite particularly preferably between 600° C. and 650° C. under slightly rich conditions (DE 102013207709).

The air-fuel ratio sets the air mass $m_{L,tats}$ which is actually available for combustion in relation to the minimum required stoichiometric air mass $m_{L,st}$, which is required for complete combustion:

$$\lambda = \frac{m_{L,tats}}{m_{L,st}}$$

If λ=1, the ratio applies as a stoichiometric air-fuel ratio where $m_{L,tats}=m_{L,st}$; this is the case if all fuel molecules can theoretically react fully with the atmospheric oxygen, without the absence of oxygen or without unburned oxygen being left over.

The following applies to combustion engines:
λ<1 (e.g. 0.9) means "lack of air": rich mixture
λ>1 (z. B. 1,1) means "surplus air": lean or poor mixture
Assertion: λ=1.1 means that 10% more air takes part in the combustion than would be necessary for the stoichiometric reaction. This is simultaneously the surplus of air.

It should be noted that a planned system such as the present one can also be a component in a larger exhaust gas cleaning system. For example, one or more nitrogen oxide storage catalysts or SCR catalysts, arranged in the underfloor, preferably based on metal-ion-exchanged zeolites (e.g. CHA, BEA) or zeolite-like compounds (e.g. SAPO), can be located on the nitrogen oxide storage catalysts arranged in proximity to the engine.

The present invention describes a possibility with which the increasingly stringent emission standards, in particular in the area of nitrogen dioxide formation in the regeneration of nitrogen oxide storage catalysts, can be met. It is proposed that the regeneration strategy for the nitrogen oxide storage catalysts be varied in relation to temperature to keep the $N_2O$ which forms during regeneration as low as possible. It is surprising that, by means of this simple measure, advantageous results can be achieved which also already make the application of this type of system possible under legal limits which are still to be standardized in the future.

EXAMPLES

As a criterion for the quality of regeneration with a view to low secondary emission formation, it is ensured that the A) lean phase (storage phase) is comparable in all applied regeneration strategies. Particular attention is given to the temperature, exhaust gas composition and lean NOx storage parameters so that there are reproducible conditions in the subsequent rich phase.

A fixed B) regeneration strategy (Table 1) follows to react the stored NOx, preferably to give $N_2$. Nine regeneration variants were set in the test sequence. These sequences differ in terms of the regeneration duration and the A-depth of immersion from which a different exhaust gas composition (HC, CO and NOx) results during regeneration. All strategies exhibit exhaust gas conditions $\lambda \leq 1$.

There then follows a brief additional C) lean phase in which the subsequent storage is assessed. Alongside the hopefully low $N_2O$ formation, it now becomes apparent whether or not the quality of the regeneration was sufficient. Quality is used here as a synonym for the ability to store NOx anew or again.

In order to ensure comparable conditions in the trial sequence, a conditioning takes place in D) which ensures that all storage centers are available for the fresh A) lean phase. This conditioning comprises a regeneration controlled by probe-related stoppages which prevent the catalyst from becoming full during a strategy with a poorly selected regeneration duration and/or $\lambda$-depth of submersion with increasing test sequences. This ensures that a high reproducibility of the individual measurements is obtained.

Figure 1:
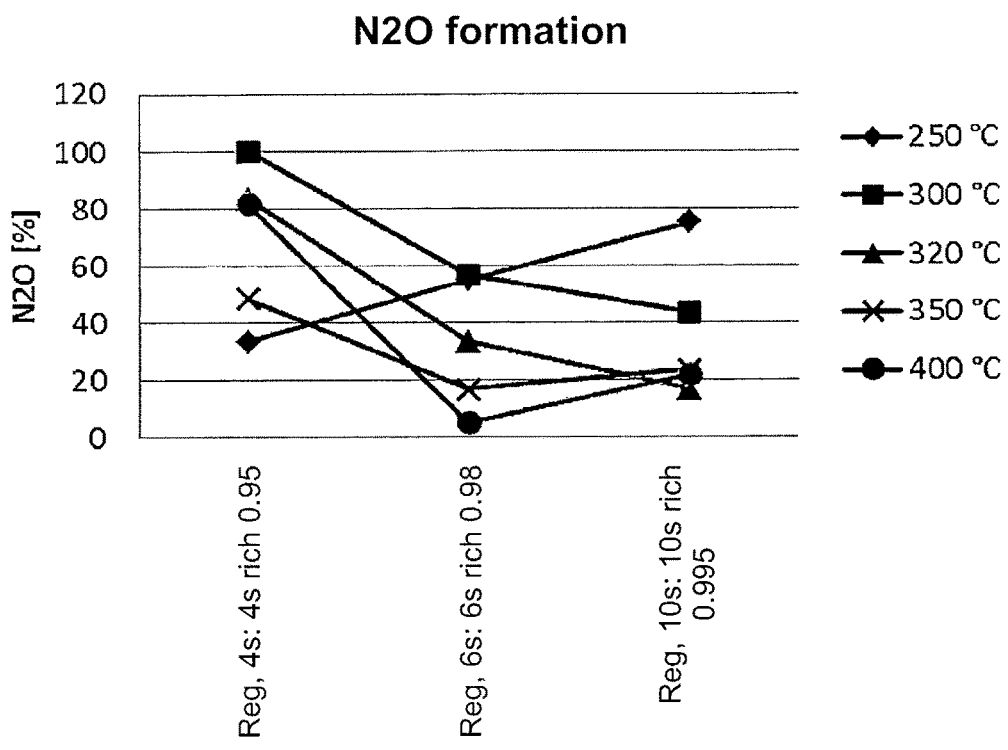
FIG. 1 shows various single-pulse symmetrical regeneration strategies and the $N_2O$ formation during regeneration for different temperatures. The relative $N_2O$ formation is given in relation to the maximum measured in the test, which is set at 100%.
Figure 2:
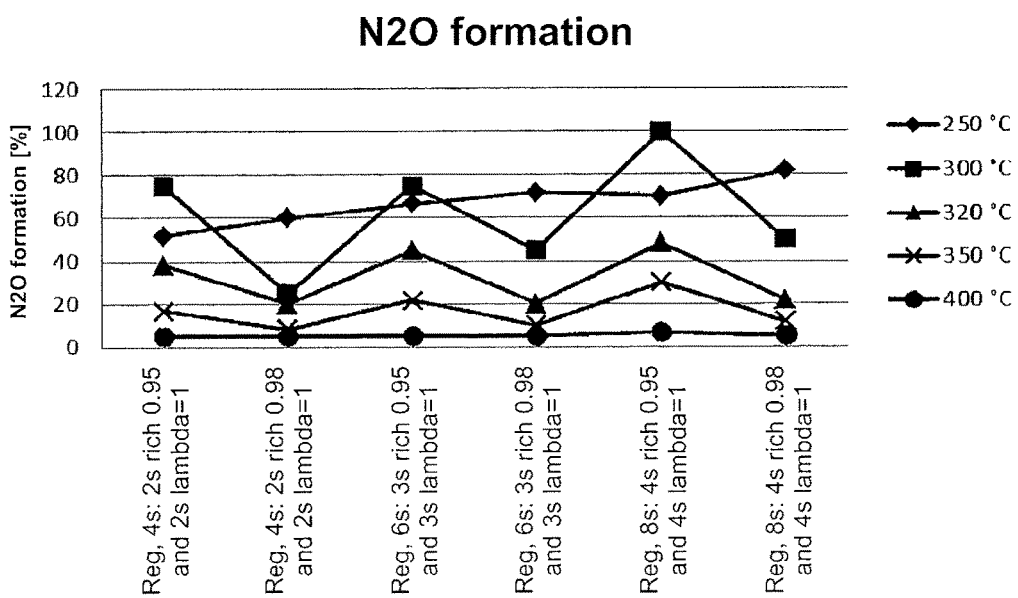
FIG. 2 shows various rich/$\lambda$=1 regeneration strategies and the $N_2O$ formation during regeneration for different temperatures. The relative $N_2O$ formation is given in relation to the maximum measured in the test, which is set at 100%.
Figure 3:
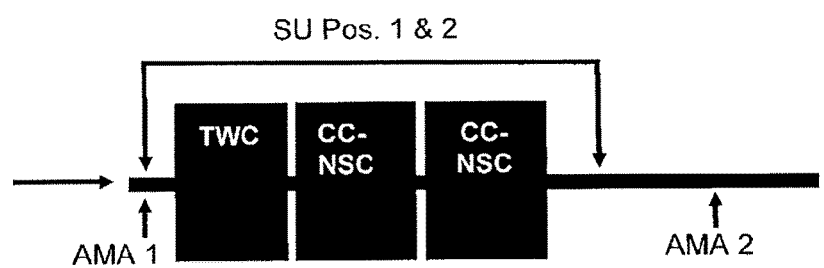
FIG. 3 shows the exhaust gas system used based on a three-way catalytic converter arranged in proximity to the engine (cc) (1st cc brick) and two downstream nitrogen oxide storage catalysts (2nd and 3rd cc brick). The special analysis positions (SU) for measuring $N_2O$ and $NH_3$ are also marked along with the analysis sampling points (AMA-L½) for measuring HC, CO and NOx.
Figure 4:
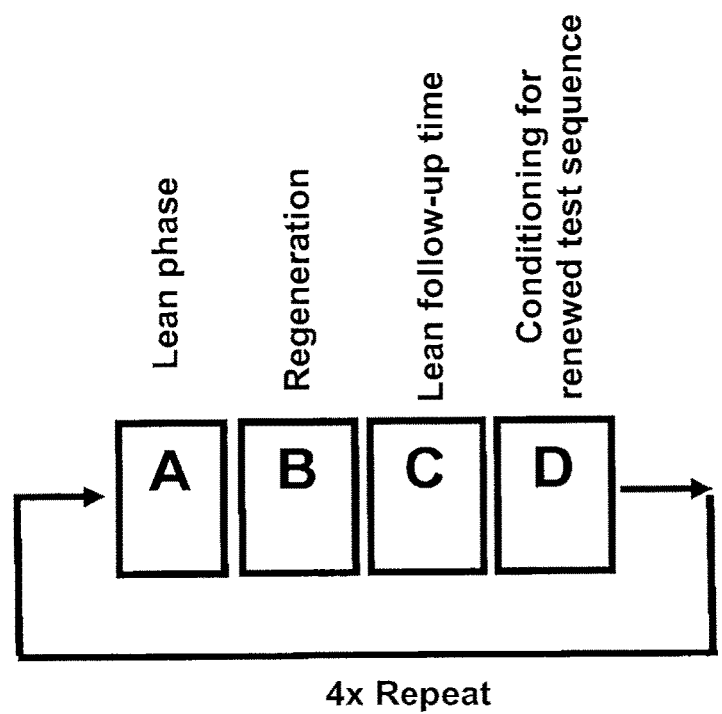
FIG. 4 provides a schematic view of the course of the trials for determining the $N_2O$ formation at different temperatures and when applying different regeneration strategies.

The procedure (FIG. 4) is repeated 7 times per regeneration strategy, wherein the last 4 test sequences are recorded and relevant mean values are formed. In this way it can be ensured that, with respect to the catalyst temperature, the system has already achieved a steady state in the first test sequence recorded. It should be stressed that the deviations between the individual test sequences within the same regeneration strategy are very small.

The invention claimed is:

1. A method of reducing $N_2O$ formation during regeneration, comprising utilizing different strategies for the regeneration of at least one nitrogen oxide storage catalyst to reduce the $N_2O$ formation during regeneration, wherein the at least one nitrogen oxide storage catalyst is used in an exhaust gas system of a spray-guided stratified operating petrol engine, wherein the different strategies are specifically selected based on the temperature of the exhaust gas such that below a temperature range of 275° C.-290° C. regeneration occurs with a shorter, but richer pulse of reducing agents than it does at temperatures above this temperature range.

2. The method according to claim 1, wherein, with regeneration strategies above this temperature range, a modulation of an $\lambda$-amplitude of a regeneration pulse is provided in such a way that a rich pulse is followed by a phase with an exhaust gas mixture at $\lambda$=1 (rich/$\lambda$=1 regeneration strategy).

3. The method according to claim 1, comprising regeneration times of under 10 sec.

4. The method according to claim 1, wherein regeneration is not carried out below $\lambda$=0.87.

5. The method according to claim 1, wherein the exhaust gas composition is set by injecting fuel into a cylinder of the engine or into the exhaust gas system upstream of the nitrogen oxide storage catalyst.

6. The method according to claim 1, wherein the regeneration of the at least one nitrogen oxide storage catalyst is controlled by one or more sensors or based on modeling.

7. The method according to claim 1, wherein the at least one nitrogen oxide storage catalyst is contained in an exhaust gas cleaning system having one or more three-way catalytic converters arranged in proximity to the engine.

8. The method according to claim 7 wherein said at least one nitrogen oxide storage catalyst includes a plurality of nitrogen oxide storage catalysts.

9. The method according to claim 8 wherein at least one of the plurality of nitrogen oxide storage catalysts is arranged in proximity to the engine.

10. The method according to claim 1 wherein said at least one nitrogen oxide storage catalyst includes a plurality of nitrogen oxide storage catalysts.

11. The method of claim 2 wherein, during the modulation, at least one phase with an exhaust gas mixture at $\lambda$=1 has a duration of 2 to 4 seconds.

12. The method of claim 11 wherein the modulation comprises repeated phases with the exhaust gas mixture at $\lambda$=1 above the temperature range of 275° C.-290° C.

13. The method of claim 2 wherein the modulation comprises repeated phases with the exhaust gas mixture at $\lambda$=1 above the temperature range of 275° C.-290° C.

14. The method of claim 2 wherein the modulation comprises $\lambda$=1 phases between the rich pulses, with the time duration of the $\lambda$=1 phases and the rich pulses being equal.

15. The method of claim 1 wherein the regeneration below the temperature range of 275° C.-290° C. occurs at least one second shorter in phase time than regeneration occurring above that temperature range.

16. The method of claim 15 wherein the regeneration occurring below the temperature range of 275° C.-290° C. is 1 to 6 seconds shorter in phase time than regeneration occurring above that temperature.

* * * * *